United States Patent
Kondo (10) Patent No.: US 10,576,951 B2
(45) Date of Patent: Mar. 3, 2020

(54) INFORMATION PROCESSING APPARATUS AND DETERMINATION METHOD

(71) Applicant: FUJITSU LIMITED, Kawasaki-shi, Kanagawa (JP)

(72) Inventor: Kentaro Kondo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 182 days.

(21) Appl. No.: 15/657,671

(22) Filed: Jul. 24, 2017

(65) Prior Publication Data
US 2017/0320475 A1 Nov. 9, 2017

Related U.S. Application Data

(63) Continuation of application No. PCT/JP2016/051901, filed on Jan. 22, 2016.

(30) Foreign Application Priority Data

Jan. 30, 2015 (JP) .................................. 2015-017831

(51) Int. Cl.
*B60T 8/172* (2006.01)
*B60T 17/22* (2006.01)

(52) U.S. Cl.
CPC .............. *B60T 8/172* (2013.01); *B60T 17/22* (2013.01); *B60T 2270/413* (2013.01); *B60Y 2400/304* (2013.01)

(58) Field of Classification Search
CPC .... B60T 8/172; B60T 17/22; B60T 2270/413; B60Y 2400/304
See application file for complete search history.

(56) References Cited

U.S. PATENT DOCUMENTS 6,789,858 B2 * 9/2004 Soejima ................ B60T 8/1766
303/113.5
6,926,373 B2 * 8/2005 Burkhard ................ B60T 8/173
303/158

(Continued)

FOREIGN PATENT DOCUMENTS

JP 2001-47831 2/2001
JP 2006-335277 12/2006

(Continued)

OTHER PUBLICATIONS

International Search Report dated Mar. 22, 2016 corresponding to International Application PCT/JP2016/051901.

(Continued)

*Primary Examiner* — Hussein Elchanti
(74) *Attorney, Agent, or Firm* — Staas & Halsey LLP (57) ABSTRACT

A determination method is performed by a computer, and the method includes determining, by processor, whether or not a brake was suddenly stepped on, on the basis of comparison between a magnitude of a forward-backward-acceleration differentiation amount obtained through temporal differentiation of acceleration in forward and backward directions of a vehicle measured by an accelerometer mounted on the vehicle and a magnitude of an upward-downward-acceleration differentiation amount obtained through temporal differentiation of acceleration in upward and downward directions of the vehicle measured by the accelerometer in a prescribed temporal interval that temporally ranges before and after a timing at which the acceleration in the forward and backward directions was measured.

7 Claims, 8 Drawing Sheets

(56) References Cited

U.S. PATENT DOCUMENTS

| | | | | |
|---|---|---|---|---|
| 9,360,323 | B2* | 6/2016 | Grokop | G01C 21/165 |
| 10,072,933 | B1* | 9/2018 | Surpi | G01C 21/165 |
| 2011/0251752 | A1* | 10/2011 | DeLarocheliere | G07C 5/008 |
| | | | | 701/31.4 |
| 2012/0029803 | A1* | 2/2012 | Yasushi | B60R 16/0236 |
| | | | | 701/123 |
| 2012/0245758 | A1* | 9/2012 | Mizuta | B60W 30/182 |
| | | | | 701/1 |
| 2014/0093400 | A1* | 4/2014 | Baur | B60K 28/14 |
| | | | | 417/53 |
| 2015/0051785 | A1* | 2/2015 | Pal | G01P 15/18 |
| | | | | 701/29.1 |
| 2015/0184348 | A1* | 7/2015 | Stracke, Jr. | G01C 21/20 |
| | | | | 702/141 |
| 2015/0298676 | A1 | 10/2015 | Matsumara et al. | |
| 2017/0092021 | A1* | 3/2017 | Nielsen | G05B 23/024 |
| 2018/0053405 | A1* | 2/2018 | de Azevedo | G08G 1/0133 |

FOREIGN PATENT DOCUMENTS

| | | |
|---|---|---|
| JP | 2006-341806 | 12/2006 |
| JP | 2008-298979 | 12/2008 |
| JP | 2012-256167 | 12/2012 |
| JP | 2014-160935 | 9/2014 |
| WO | 2014/080507 A1 | 5/2014 |

OTHER PUBLICATIONS

Midori Mori et al., "An Effective Automatic Classification Method of Drive Recorder Data without a Threshold", The Japanese Journal of Ergonomics, vol. 49, No. Supplement, pp. S248-S249, 2013.

* cited by examiner

| TIME | FORWARD-BACKWARD ACCELERATION | UPWARD-DOWNWARD ACCELERATION |
|---|---|---|
| 2014.12.12 19:18:30 | **** | **** |
| 2014.12.12 19:18:31 | **** | **** |
| 2014.12.12 19:18:32 | **** | **** |
| 2014.12.12 19:18:33 | **** | **** |
| 2014.12.12 19:18:34 | **** | **** |
| ⋮ | ⋮ | ⋮ |

| TIME | FORWARD-BACKWARD ACCELERATION | UPWARD-DOWNWARD ACCELERATION | RIGHTWARD-LEFTWARD ACCELERATION |
|---|---|---|---|
| 2014.12.12 19:18:30 | **** | **** | **** |
| 2014.12.12 19:18:31 | **** | **** | **** |
| 2014.12.12 19:18:32 | **** | **** | **** |
| 2014.12.12 19:18:33 | **** | **** | **** |
| 2014.12.12 19:18:34 | **** | **** | **** |
| ... | ... | ... | ... |

F I G. 6

F I G. 7

F I G. 8

INFORMATION PROCESSING APPARATUS AND DETERMINATION METHOD

CROSS-REFERENCE TO RELATED APPLICATION

This application is a continuation application of International Application PCT/JP2016/051901 filed on Jan. 22, 2016 and designated the U.S., the entire contents of which are incorporated herein by reference. The International Application PCT/JP2016/051901 is based upon and claims the benefit of priority of the prior Japanese Patent Application No. 2015-017831, filed on Jan. 30, 2015, the entire contents of which are incorporated herein by reference.

FIELD

The embodiments discussed herein are related to an information processing apparatus and a determination method.

BACKGROUND

In recent years, cases are increasing in which on-board devices, such as a drive recorder, a digital tachometer, etc., that measure data related to travel of vehicles are mounted on the vehicles. Also, there are cases for example where an incident in which the brake is suddenly stepped on in a vehicle (which may also be referred to as a sudden braking incident hereinafter in some cases) is detected from the acceleration of the vehicle measured by the on-board device and information of the occurrence of the sudden braking incident is used to alarm the driver, to detect the occurrence of an accident or for other purposes.

In relation to this, a technique is known in which an acceleration sensor that detects the acceleration in the traveling direction is installed in a vehicle, whether appropriate driving is being performed is diagnosed upon starting and stopping and correction of inappropriate driving that depends on tendencies of the driver such as sudden starting, sudden stopping, etc. is conducted (see Document 1 for example). Also, a technique for providing a vehicle state determination device that can preferably determine the state of a vehicle even from limited information such as the acceleration etc. obtained from the sensor is known (see Document 2 for example). A method for classifying pieces of accident/near miss data and other pieces of data precisely and automatically is also known (see Document 3 for example).

Document 1: Japanese Laid-open Patent Publication No. 2006-341806

Document 2: International Publication Pamphlet No. WO2014/080507

Document 3: Mori, Midori, et al, "An Effective Automatic Classification Method of Drive Recorder Data without a Threshold", The Japanese Journal of Ergonomics, Vol. 49, No. Supplement pp. S248-S249, 2013

SUMMARY

According to an aspect of the embodiments, a determination method is performed by a computer, and the method includes determining, by processor, whether or not a brake was suddenly stepped on, on the basis of comparison between a magnitude of a forward-backward-acceleration differentiation amount obtained through temporal differentiation of acceleration in forward and backward directions of a vehicle measured by an accelerometer mounted on the vehicle and a magnitude of an upward-downward-acceleration differentiation amount obtained through temporal differentiation of acceleration in upward and downward directions of the vehicle measured by the accelerometer in a prescribed temporal interval that temporally ranges before and after a timing at which the acceleration in the forward and backward directions was measured.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 schematically exemplifies relationships between speeds, forward-backward acceleration and the differentiation amounts of the forward-backward acceleration of a vehicle in a case when the brake is suddenly stepped on;

DESCRIPTION OF EMBODIMENTS

In a case when for example a driver abruptly notices that a danger is approaching and steps on the brake in an urgent situation, that braking manipulation is often a sudden stepping on the brake. Also, in a case when a sudden braking manipulation as described above is performed, there is a tendency in which that braking incident appears as the peak of the absolute value in the differentiation amount of the forward-backward acceleration of the vehicle. Note that the forward-backward acceleration may be for example acceleration occurring in the anterior-posterior axis having, as its anteriority, the traveling direction in a case where the vehicle is traveling forward straightly, and the differentiation amount of the forward-backward acceleration may be a value obtained by performing temporal differentiation on the forward-backward acceleration. Thus, the differentiation amount of forward-backward acceleration has high sensitivity for detecting for example a sudden braking incident in which the driver senses a danger and quickly steps on the brake. However, in addition to the cases of the occurrence of a sudden braking incident, the differentiation amount of forward-backward acceleration often becomes a value that is equal to or greater than a prescribed value even in a case when for example a vehicle travels over a convex or concave portion of the road of the traveling vehicle. Thus, even when for example attempts are made to use the differentiation amount of forward-backward acceleration to detect the occurrence of a sudden braking incident, noise caused by a fact that the vehicle traveled on a convex or concave portion of a road is sometimes picked up. Accordingly, a technique that can improve the detection accuracy of occurrence of sudden braking incidents is desired.

Hereinafter, by referring to the drawings, some embodiments of the present invention will be explained in detail. Note that corresponding elements in a plurality of drawings are denoted by the same symbols.

Figure 1:
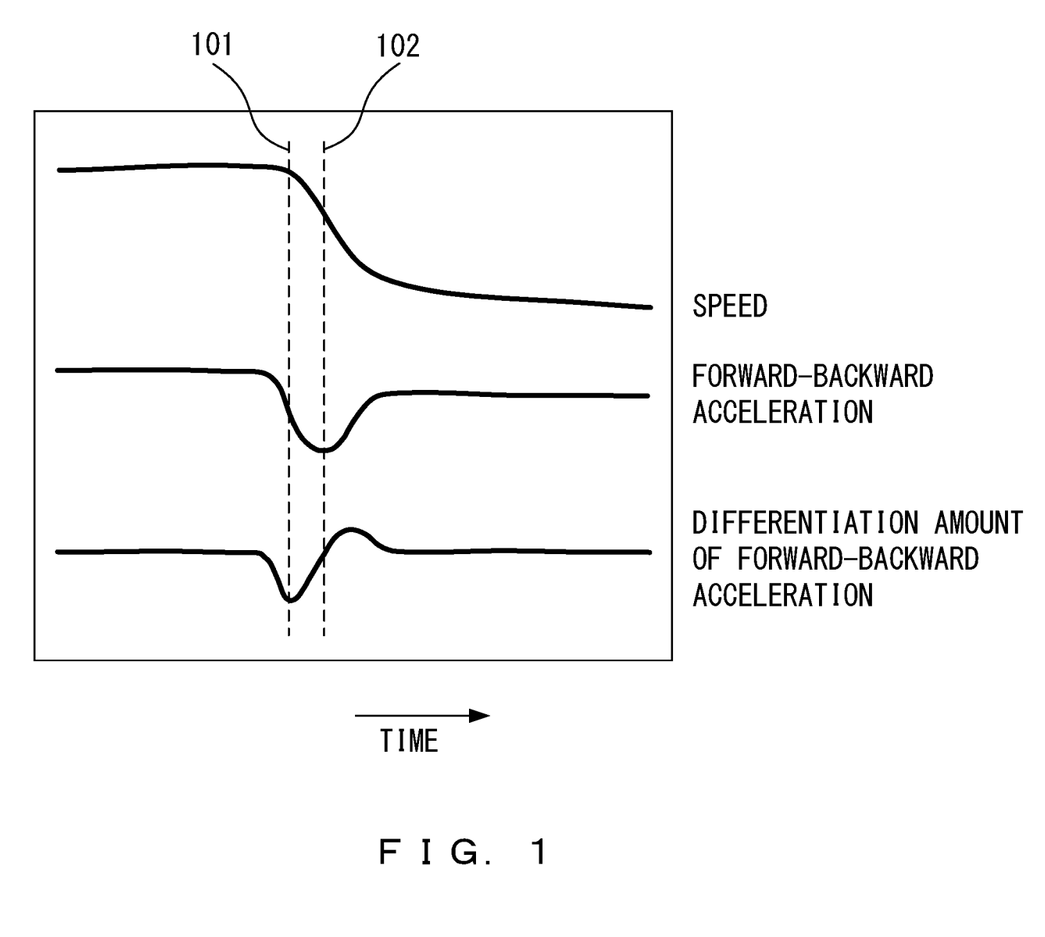

As described above, in a case when for example a driver abruptly notices that a danger is approaching and steps on the brake in an urgent situation, that braking manipulation is often a sudden stepping on the brake. FIG. 1 schematically exemplifies relationships between speeds of a vehicle, forward-backward acceleration and the differentiation amounts of the forward-backward acceleration obtained by performing temporal differentiation on the forward-backward acceleration, in a case when the brake is suddenly stepped on in the vehicle. In FIG. 1, the upper portion is a graph of speeds, the middle portion is a graph of forward-backward acceleration and the lower portion is a graph of the differentiation amounts of forward-backward acceleration. Also, the horizontal axis is time.

Also, it is assumed for example that the driver abruptly sensed some danger and suddenly stepped on the brake at a point in time 101. In such a case, the speed starts decreasing from the point in time 101, at which the driver started stepping on the brake, as an abrupt changing point. Thereafter, the driver makes the stepping on the brake deeper and the time rate of change of the speed becomes maximum at a point in time 102, and as the driver loosens the stepping on the brake, the decrease in the speed becomes moderates. For example, in this case, when the graph of the forward-backward acceleration corresponding to the speed is referred to, the magnitude (absolute value) of the forward-backward acceleration becomes maximum at the point in time 102, at which the stepping on the brake becomes deeper. As described, the depth of stepping on the brake tends to appear as the magnitude of the forward-backward acceleration, the magnitude of forward-backward acceleration may represent a high value due to the occurrence of a sudden braking incident, making it possible to use the magnitude to detect a sudden braking incident. However, the magnitude of forward-backward acceleration has a possibility of representing a high value even when for example the driver slowly started stepping on the brake and thereafter stepped on the brake to a deep portion. In such a case, it is thought that the driver is performing a braking manipulation with a margin and the case may be a case that is not related to a sudden stepping on a brake, in which the brake is stepped on in a dangerous situation having urgency. Also, in detecting occurrence of a sudden braking incident, it is desirable to be able to distinguish between a case where a driver is performing a braking manipulation with a margin as described above and a sudden stepping on a brake. Also, as another example, in a case when a driver quickly steps on the brake in order to negotiate a danger and the avoidance of the danger is relatively easy, the amount of the stepping on the brake is often not so large. In order to detect such low-level dangerous incidents without omissions, it is needed to conduct determination while emphasizing whether or not the stepping on the brake is sudden.

In this example, whether or not a stepping on a brake is sudden tends to appear as the magnitude (absolute value) of the differentiation amount of forward-backward acceleration obtained by performing temporal differentiation on the forward-backward acceleration. For example, in FIG. 1, when the differentiation amount of forward-backward acceleration corresponding to the speed is referred to, the magnitude (absolute value) becomes maximum at the point in time 101, which is the starting point of the stepping on the brake, and the differentiation amount of the forward-backward acceleration has high correlation with a sudden manipulation of stepping on the brake at the occurrence time of the sudden braking incident. Thus, using the differentiation amount of forward-backward acceleration makes it possible to detect sudden braking incidents with high sensitivity.

However, in addition to the cases of the occurrence of a sudden braking incident, the differentiation amount of forward-backward acceleration often becomes a value that is equal to or greater than a prescribed value even in a case when for example a vehicle travels over a convex or concave portion of a road. Thus, in a case when for example it is attempted to use the differentiation amount of forward-backward acceleration to detect occurrence of a sudden braking incident, noise caused by a fact that the vehicle traveled on a convex or concave portion of a road is sometimes picked up, making the use difficult.

In this example, in a case for example when a vehicle travels on a convex or concave portion of a road and the vehicle bounces or vibrates during the travel, the motion of the vehicle is upward and downward motion and thus a variation is detected in the differentiation amount that is obtained by performing temporal differentiation on the upward and downward acceleration measured in the vehicle. In other words, a differentiation amount obtained by performing temporal differentiation on upward and downward acceleration has strong correlation with bounces or vibrations of the traveling vehicle. Note that upward and downward acceleration may be for example acceleration generated in a vehicle on the up-down axis having, as its downward direction, the direction of the gravity in a case when the vehicle is stopped on a horizontal surface, and may also be referred to as upward-downward acceleration in some cases hereinafter. Also, the differentiation amount obtained by performing temporal differentiation on upward-downward acceleration will also be referred to as differentiation amount of upward-downward acceleration. Also, by for example comparing the magnitude of the differentiation amount of forward-backward acceleration with the magnitude of the differentiation amount of upward-downward acceleration having strong correlation with bounces or vibrations, it is possible to determine whether or not the cause of the variation is that vehicle traveled on a convex or concave portion of a road or to a sudden stepping on a brake. Accordingly, in some embodiments including examples that will be described below, by comparing the magnitude of the differentiation amount of forward-backward acceleration obtained by performing temporal differentiation on forward-backward acceleration with the magnitude of differentiation amount of upward-downward acceleration obtained by performing temporal differentiation on upward-downward acceleration, whether or not a sudden stepping on a brake occurred is determined. Accordingly, it possible to detect occurrence of a sudden braking incident with high accuracy.

Figure 2:
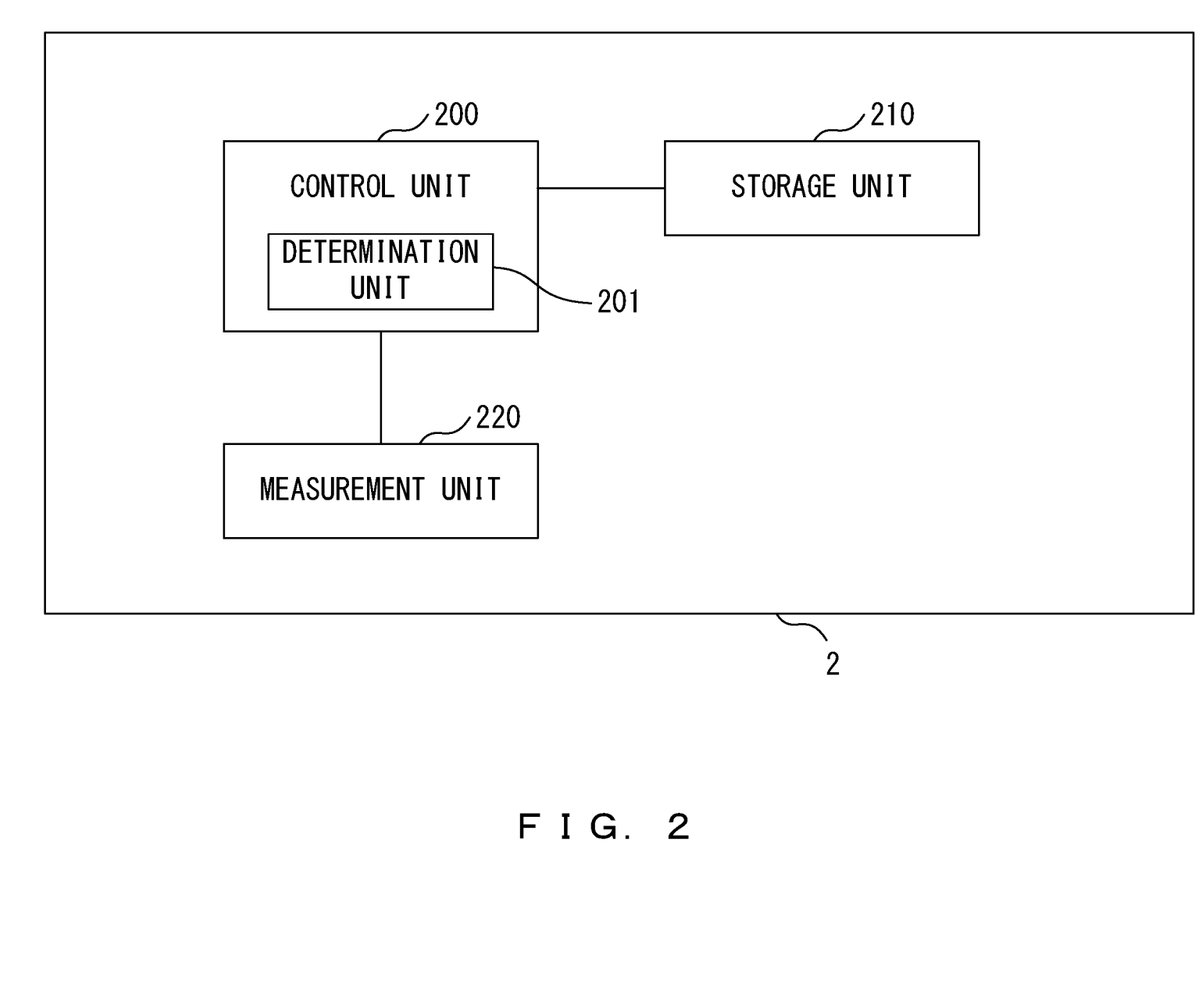
FIG. 2 exemplifies a functional block configuration of an on-board device according to some embodiments.

FIG. 2 exemplifies a functional block configuration of an on-board device 2 according to some embodiments. The on-board device 2 includes for example a control unit 200, a storage unit 210 and a measurement unit 220. The control unit 200 may be connected to for example the storage unit 210 and the measurement unit 220, and the control unit 200 may control respective units of the on-board device 2 including the storage unit 210 and the measurement unit 220. Also, the control unit 200 may include for example a determination unit 201. The storage unit 210 may store for example a program and information such as measurement record information 300, which will be described later, or measurement record information 600, etc. The measurement unit 220 may be for example an accelerometer. In one embodiment, the measurement unit 220 may measure for example the forward-backward acceleration and the upward-downward acceleration of a vehicle on which the on-board device 2 is mounted. Note that these respective units and information stored in the storage unit 210 will be described later in detail. Hereinafter, the first embodiment will be explained.

First Embodiment

Figure 3:
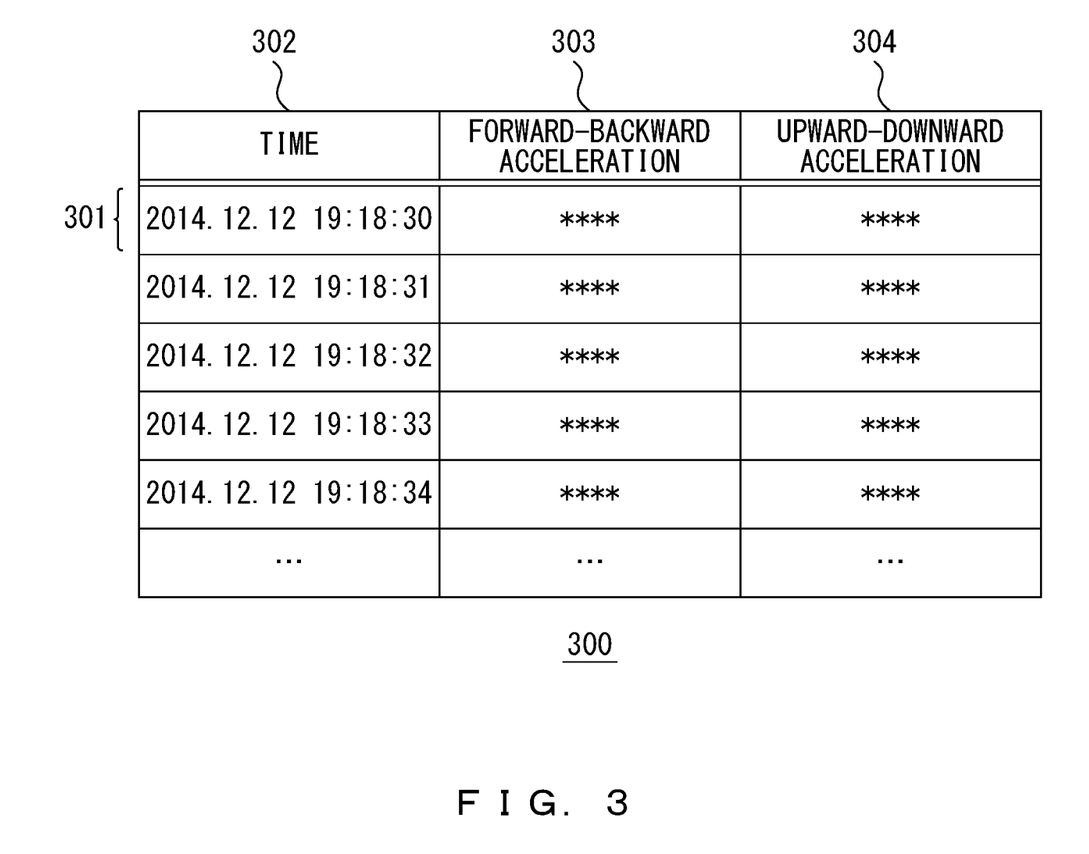
FIG. 3 exemplifies measurement record information according to the first embodiment.

FIG. 3 exemplifies the measurement record information 300 according to the first embodiment. In the measurement record information 300, for example measurement information 301 is registered. The measurement information 301 may include for example information of a time 302, forward-backward acceleration 303 and upward-downward acceleration 304, and these pieces of information are associated in the measurement information 301. The time 302 may be for example a time at which the forward-backward acceleration 303 and the upward-downward acceleration 304 associated in the measurement information 301 was measured by the measurement unit 220. In the example of FIG. 3, the measurement information 301 is registered in the measurement record information 300 in time series. The forward-backward acceleration 303 may be for example forward-backward acceleration measured by the measurement unit 220. The upward-downward acceleration 304 may be for example upward-downward acceleration measured by the measurement unit 220. In one embodiment, the measurement unit 220 of the on-board device 2 may measure forward-backward acceleration and upward-downward acceleration of the vehicle for each prescribed time (0.5 seconds through 3 seconds or so for example) so as to report the measurement values to the control unit 200. The control unit 200 may register measurement values of the reported forward-backward acceleration and the upward-downward acceleration of the vehicle in the measurement record information 300 of the storage unit 210 as the measurement information 301 together with a measurement time.

Figure 4:
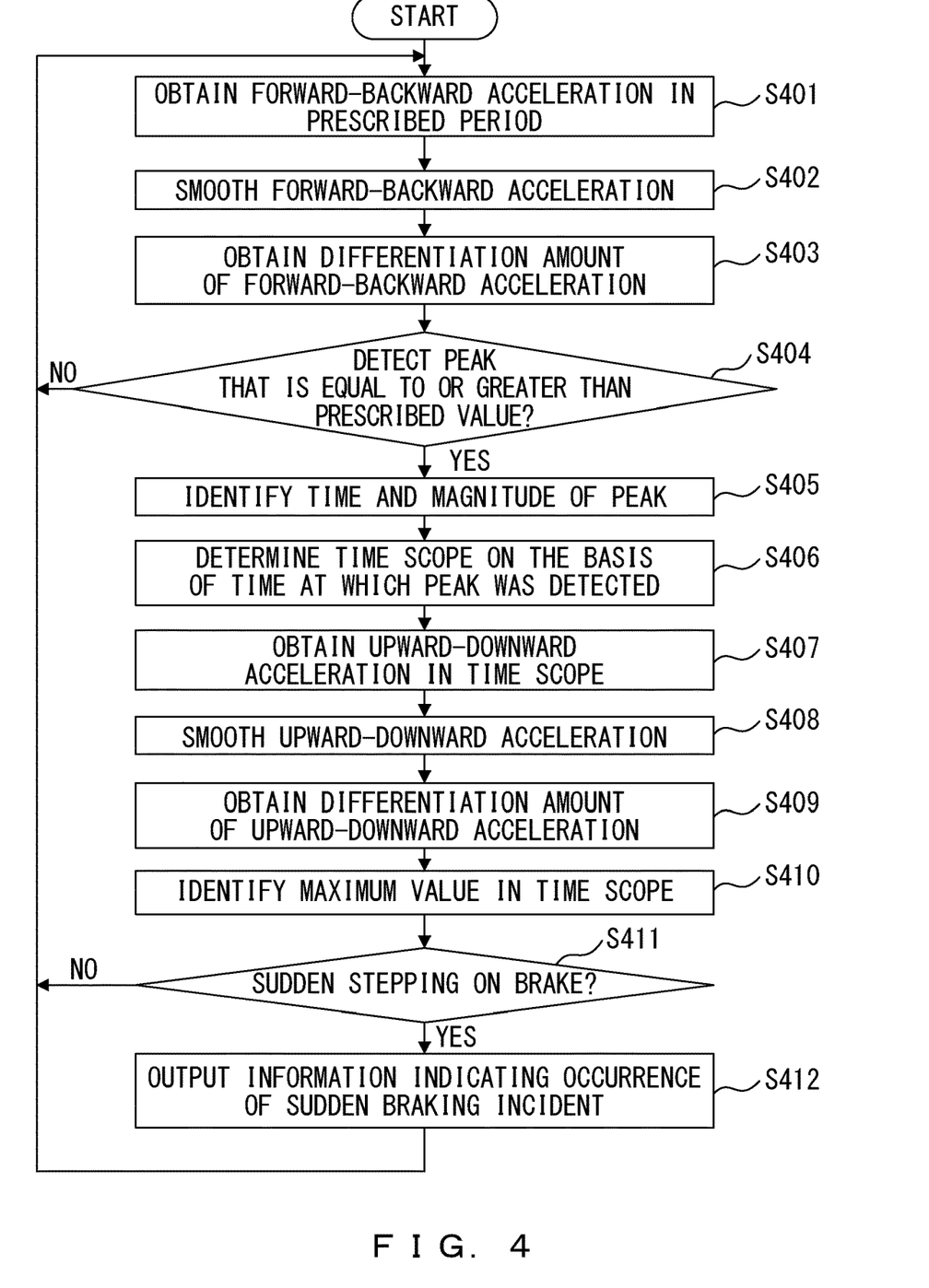
FIG. 4 exemplifies a determination process of a sudden braking incident according to the first embodiment.

FIG. 4 exemplifies a determination process of a sudden braking incident performed by the control unit 200 of the on-board device 2 according to the first embodiment. In one embodiment, the control unit 200 of the on-board device 2 may start the determination process of the sudden braking incident of FIG. 4 when for example the power of the on-board device 2 is supplied.

In step S401 (hereinafter, a step is represented by "S" as in S401 for example), the control unit 200 obtains, in association with the time 302 and, the forward-backward acceleration 303 measured during a prescribed period from the measurement record information 300. In this example, a prescribed period may be for example a period as a target in which presence or absence of occurrence of a sudden braking incident is determined. For example, as will be described later, the processes from S401 through S412 may be repeated processes, and the control unit 200, in S401, may use, as a prescribed period, the scope of a prescribed temporal interval including the latest measurement information 301 measured by the measurement unit 220 for each time of the repeating in S401. Also, the control unit 200 may obtain the forward-backward acceleration 303 associated with the time 302 by reading the measurement information 301 having the time 302 in a prescribed period from the measurement record information 300.

In S402, the control unit 200 smoothes the obtained forward-backward acceleration 303. For example, because a measurement value of a forward-backward acceleration measured by the measurement unit 220 involves a measurement error, when a measurement value is applied to a temporal differentiation, which will be described later, as it is, a peak that becomes noise other than a peak caused by a sudden stepping on a brake is detected. In the present embodiment, in order to reduce such peaks that become noise, the control unit 200 performs a process of smoothing the forward-backward acceleration 303. In one embodiment, smoothing may be performed by using a method of kernel smoothing. Also, for a kernel function used in kernel smoothing, equation 1 or 2 below for example may be used.

[Equation 1]

$$K(t) = \begin{cases} \frac{1}{2\delta t} & \text{if } |t| < \delta t \\ 0 & \text{otherwise} \end{cases} \quad \text{EQUATION 1}$$

[Equation 2]

$$K(t) = \begin{cases} \frac{3}{4\delta t}\left(1 - \left(\frac{t}{\delta t}\right)^2\right) & \text{if } |t| < \delta t \\ 0 & \text{otherwise} \end{cases} \quad \text{EQUATION 2}$$

For example, by using these kernel functions, the value of smoothed forward-backward acceleration at time t is obtained in a weighted average calculation by using, as an input value, a set of the forward-backward acceleration 303, obtained in S401, associated with the time 302. In one embodiment, the value of smoothed forward-backward acceleration at time t may be obtained by equation 3 below for example.

[Equation 3]

$$\tilde{g}(t) = \frac{\sum_{|t-t_i|<\delta t} K(t-t_i)g(t_i)}{\sum_{|t-t_i|<\delta t} K(t-t_i)} \quad \text{EQUATION 3}$$

$\tilde{g}(t)$: VALUE OF SMOOTHED FORWARD-BACKWARD ACCELERATION AT TIME t
$g(t_i)$: MEASUREMENT VALUE OF FORWARD-BACKWARD ACCELERATION AT TIME $t_i$ Next, in S403, the control unit 200 performs temporal differentiation to forward-backward acceleration smoothed in S402, and calculates the differentiation amount of forward-backward acceleration. A calculation of the differentiation amount of forward-backward acceleration may be conducted through a calculation based on a difference for example, and may be conducted by equation 4 below in one embodiment.

[Equation 4]

$$\overset{*}{\tilde{g}}(t) = \frac{\tilde{g}\left(t + \frac{1}{2}\Delta t\right) - \tilde{g}\left(t - \frac{1}{2}\Delta t\right)}{\Delta t} \quad \text{EQUATION 4}$$

ġ: DIFFERENTIATION AMOUNT OF FORWARD-BACKWARD ACCELERATION AT TIME t

In equation 4, time subtraction: Δt may be a value in a range between for example 0.1 second through 0.5 seconds, and may be 0.2 seconds in one embodiment. Note that it is desirable that in order to avoid influence of for example measurement errors, time subtraction be not made too small. By using equation 4, the control unit 200 may calculate the differentiation amount of a plurality of pieces of forward-backward acceleration in a prescribed period that is a target during which presence or absence of occurrence of a sudden braking incident and used for reading the measurement information 301 in S401 is determined.

In S404, the control unit 200 uses the differentiation amount of a plurality of pieces of forward-backward acceleration calculated in S403 so as to detect a peak having a magnitude whose absolute value of the differentiation amount of forward-backward acceleration is equal to or greater than a prescribed value in a prescribed period used for reading the measurement information 301 in S401. When a peak whose absolute value of the differentiation amount of forward-backward acceleration is equal to or greater than a prescribed value is not detected (NO in S404), the flow returns to S401. When a peak whose absolute value of the differentiation amount of forward-backward acceleration is equal to or greater than a prescribed value is detected (YES in S404), the flow proceeds to S405. Note that by detecting a peak whose absolute value of the differentiation amount of forward-backward acceleration is equal to or greater than a prescribed value through the determination in S404, it is possible to further exclude a peak of noise that is caused by for example neither occurrence of a sudden braking incident nor a fact that the vehicle traveled on a convex or concave portion of a road. In S405, the control unit 200 identifies the time of a detected peak and the absolute value of the differentiation amount of the forward-backward acceleration at the peak, and the flow proceeds to S406.

In S406, the control unit 200 determines a time scope on the basis of a detection time of a peak. For example, the control unit 200 may determine the scope of a prescribed temporal interval that temporally ranges before and after the detection time of a peak to be a time scope.

In S407, the control unit 200 obtains the upward-downward acceleration measured in a time scope determined in S406. In one embodiment, the control unit 200 may read the measurement information 301 having the time 302 in the time scope determined in S406 so as to obtain the information of the upward-downward acceleration 304 associated with the time 302. In S408, the control unit 200 smoothes the obtained upward-downward acceleration 304. In one embodiment, smoothing may be performed by using for example a method of kernel smoothing as described in S402. For example, the control unit 200 may use, as an input value, a set of the obtained upward-downward acceleration 304 in time series instead of the forward-backward acceleration 303 used in S402 so as to obtain, in a weighted average calculation, the value of the smoothed upward-downward acceleration at time t by equation 3 above.

In S409, the control unit 200 performs temporal differentiation on the smoothed upward-downward acceleration so as to calculate the differentiation amount of upward-downward acceleration. Note that a calculation of the differentiation amount of upward-downward acceleration may be conducted by calculating equation 4 above by using for example smoothed upward-downward acceleration instead of the smoothed forward-backward acceleration used in S403 above. Note that in S409, the control unit 200 may use equation 4 to calculate the differentiation amount of a plurality of pieces of upward-downward acceleration in the time scope determined in S406.

In S410, the control unit 200 uses the differentiation amount of a plurality of calculated pieces of upward-downward acceleration so as to identify the maximum value of the absolute value of the differentiation amount of upward-downward acceleration in the time scope determined in S406. In S411, the control unit 200 compares the peak value of the absolute value of the differentiation amount of the forward-backward acceleration identified in S405 and the maximum value of the absolute value of the differentiation amount of the upward-downward acceleration identified in S410 so as to determine whether or not the peak is due to a sudden braking incident. In one embodiment, the control unit 200 may determine that a sudden braking incident occurred when for example the absolute value of the differentiation amount of forward-backward acceleration is greater than the absolute value of the differentiation amount of upward-downward acceleration. Also, the control unit 200 may determine that a sudden braking incident did not occur when for example the absolute value of the differentiation amount of upward-downward acceleration is greater than the absolute value of the differentiation amount of forward-backward acceleration. When it is determined that a sudden braking incident did not occur in S411 (NO in S411), the flow returns to S401. When it is determined that a sudden braking incident occurred in S411 (YES in S411), the flow proceeds to S412. Note that the control unit 200 may function as the determination unit 201 in the process of S411.

In S412, the control unit 200 outputs information indicating that a sudden braking incident occurred, and the flow returns to S401. In one embodiment, the control unit 200 may output information that instructs an audio output device provided in the on-board device 2 to issue an alarming sound, as information indicating that a sudden braking incident occurred. Thereby, it is possible to warn for example a driver who suddenly stepped on a brake.

Figure 5:
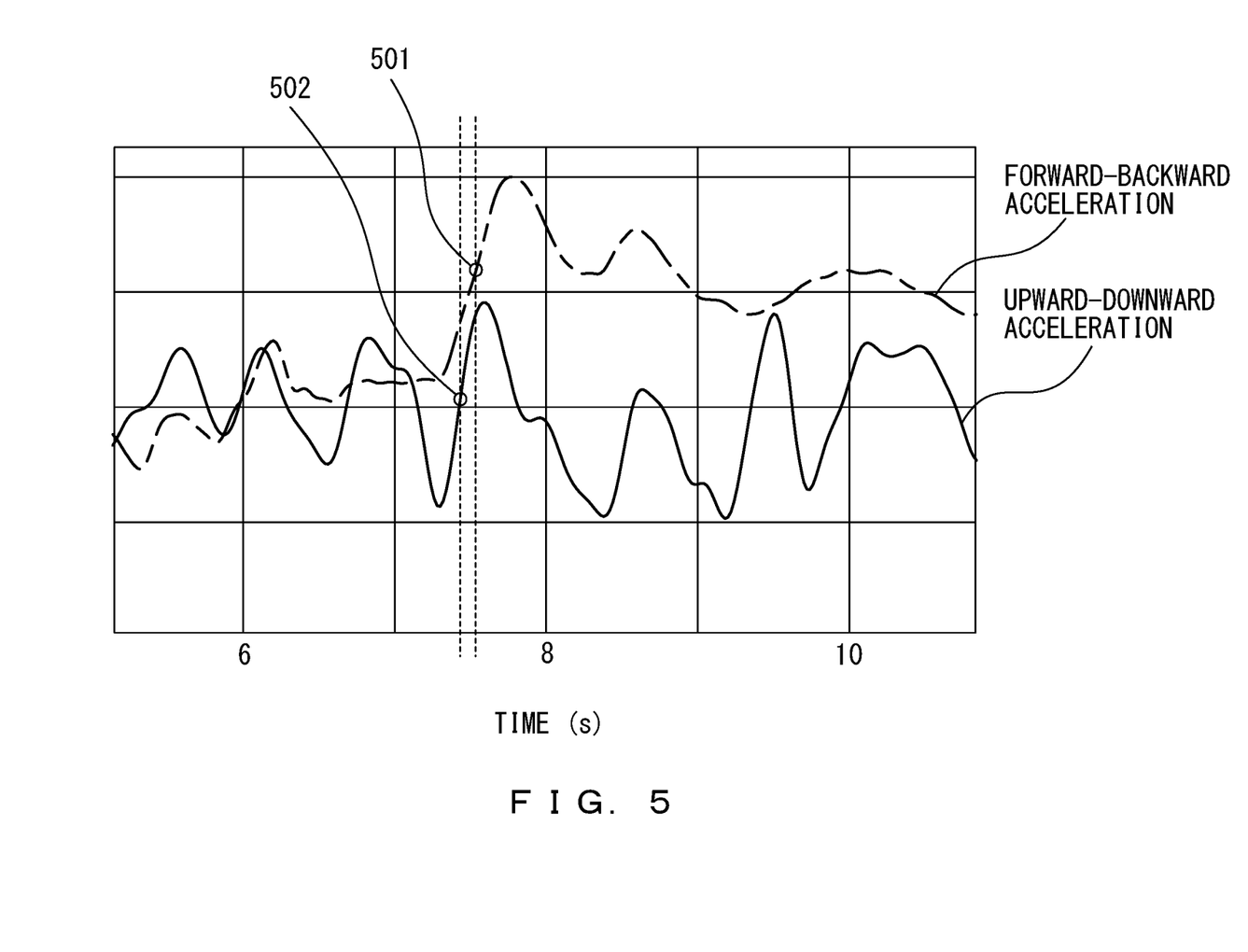
FIG. 5 exemplifies forward-backward acceleration and upward-downward acceleration in a case when a vehicle travels on a convex or concave portion of a road.

Note that in the above operation flow, the control unit 200 sets the scope of a prescribed temporal interval that temporally ranges before and after the time at which the peak of the magnitude of the differentiation amount of the forward-backward acceleration was measured, as the time scope for detecting the maximum value of the magnitude of the differentiation amount of upward-downward acceleration. This is because when a vehicle travels on a convex or concave portion of a road, there is a possibility that the detection time of the peak of the management of the differentiation amount of the forward-backward acceleration and the detection time of the peak of the magnitude of the differentiation amount of the upward-downward acceleration will not match. FIG. 5 exemplifies forward-backward acceleration and upward-downward acceleration in a case when a vehicle travels on a convex or concave portion of a road. Note that the forward-backward acceleration and the upward-downward acceleration have been smoothed in FIG. 5. Also, a point in time 501, at which the peak of the magnitude of the differentiation amount of forward-backward acceleration was detected, does not match a point in time 502, at which the peak of the management of the differentiation amount of upward-downward acceleration was detected, and a difference of about 0.2 seconds is seen. Accordingly, in the first embodiment, the control unit 200 obtains the maximum value of the magnitude of the differentiation amount of upward-downward acceleration from upward-downward acceleration measured in a prescribed temporal interval that temporally ranges before and after the timing at which peak of the magnitude of the differentiation amount of forward-backward acceleration was measured. Thereby, appropriate comparison is possible between the magnitude of the differentiation amount of forward-backward acceleration and the magnitude of the differentiation amount of upward-downward acceleration.

As described above, in the first embodiment, the control unit 200 determines the presence or absence of occurrence of the sudden braking incident on the basis of comparison between the magnitude of the differentiation amount of forward-backward acceleration and the magnitude of the differentiation amount of upward-downward acceleration. As described above, the differentiation amount of upward-downward acceleration has strong correlation with bounces or vibrations of a vehicle during its travel. Accordingly, by comparing the differentiation amount of forward-backward acceleration and the differentiation amount of upward-downward acceleration, it is possible to for example determine whether or not the cause of a variation in the magnitude of the differentiation amount of forward-backward acceleration is that the vehicle traveled on a convex or concave portion of a road or to a sudden stepping on a brake. For example, when the differentiation amount of forward-backward acceleration having a magnitude that is equal to or greater than a prescribed value and the magnitude of the differentiation amount of upward-downward acceleration measured at a time around the detection time of the differentiation amount of the forward-backward acceleration is greater than the magnitude of the differentiation amount of forward-backward acceleration, it is possible to estimate that the cause is that the vehicle traveled on a convex or concave portion of a road. Meanwhile, when for example the magnitude of the differentiation amount of forward-backward acceleration is greater than the magnitude of the differentiation amount of upward-downward acceleration measured at a time around the detection time of the differentiation amount of forward-backward acceleration, it is possible to estimate that the cause is a sudden stepping on the brake. Thus, according to the first embodiment, the control unit 200 can detect occurrence of a sudden braking incident with high accuracy.

Second Embodiment

In the second embodiment, explanations will be given for an example in which presence or absence of occurrence of a sudden braking incident is determined on the basis of comparison with the magnitude of the differentiation amount of rightward-leftward acceleration obtained by performing temporal differentiation on acceleration in the left and right directions of a vehicle in addition to the above comparison between the magnitude of the differentiation amount of forward-backward acceleration and the magnitude of the differentiation amount of upward-downward acceleration. Note that acceleration in the left and right directions of a vehicle may be acceleration occurring in the left-right axis that is orthogonal to above the anterior-posterior axis of the vehicle, in which forward-backward acceleration is measured, and to the up-down axis of the vehicle, in which upward-downward acceleration is measured. Hereinafter, acceleration in the left and right directions of a vehicle may also be referred to as rightward-leftward acceleration in some cases.

When a vehicle travels on a convex or concave portion of a road during its travel, a variation is sometimes measured also in the differentiation amount of rightward-leftward acceleration. Rightward-leftward acceleration may occur in a case when a vehicle tilts to the left or right while it is traveling on a convex or concave portion of a road such as when only the two wheels on the right or left side of the vehicle run on something convex or concave or other cases. Accordingly, by comparing for example the magnitude of the differentiation amount of forward-backward acceleration and the magnitude of the differentiation amount of rightward-leftward acceleration, the detection accuracy of occurrence of a sudden braking incident can be improved. Hereinafter, the second embodiment will be explained.

Figure 6:
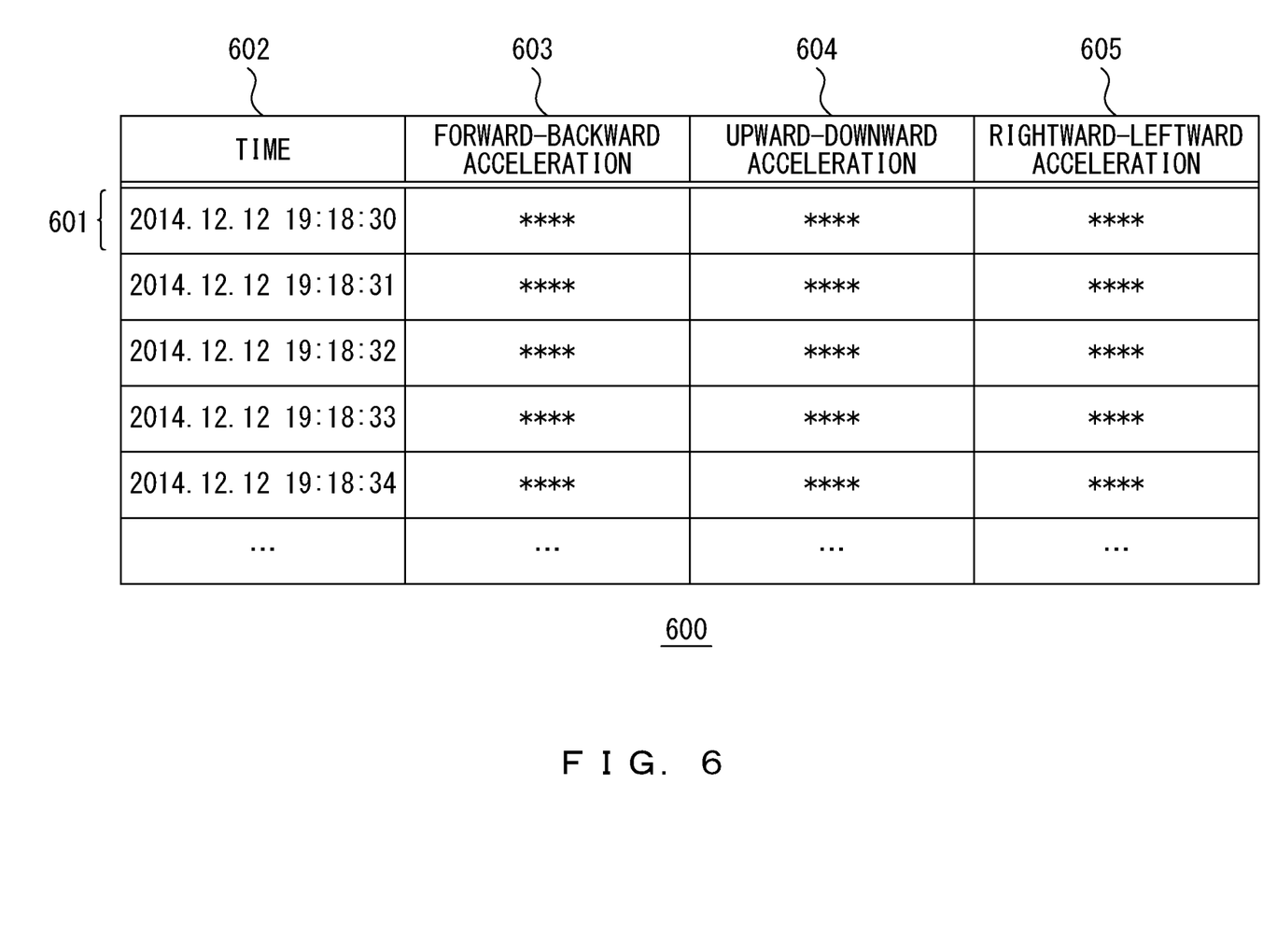
FIG. 6 exemplifies measurement record information according to the second embodiment.

FIG. 6 exemplifies the measurement record information 600 according to the second embodiment. In the measurement record information 600, for example measurement information 601 may be registered. The measurement information 601 may include for example information of a time 602, forward-backward acceleration 603, upward-downward acceleration 604, rightward-leftward acceleration 605, etc, and these pieces of information are associated in the measurement information 601. Note that the time 602, the forward-backward acceleration 603 and the upward-downward acceleration 604 may be pieces of information that are respectively similar to for example the time 302, the forward-backward acceleration 303 and the upward-downward acceleration 304 included in the measurement information 301 illustrated in FIG. 3. Note that the rightward-leftward acceleration 605 may be for example the rightward-leftward acceleration measured by the measurement unit 220 at the time 602. One embodiment, the measurement unit 220 of the on-board device 2 may measure forward-backward acceleration, upward-downward acceleration and rightward-leftward acceleration of the vehicle for each prescribed time (0.5 seconds through 3 seconds or so for example) so as to report the measurement values to the control unit 200. Also, the control unit 200 may register measurement values of the forward-backward acceleration, the upward-downward acceleration and the rightward-leftward acceleration of the vehicle in the measurement record information 600 of the storage unit 210 as the measurement information 601 together with a measurement time.

Figure 7:
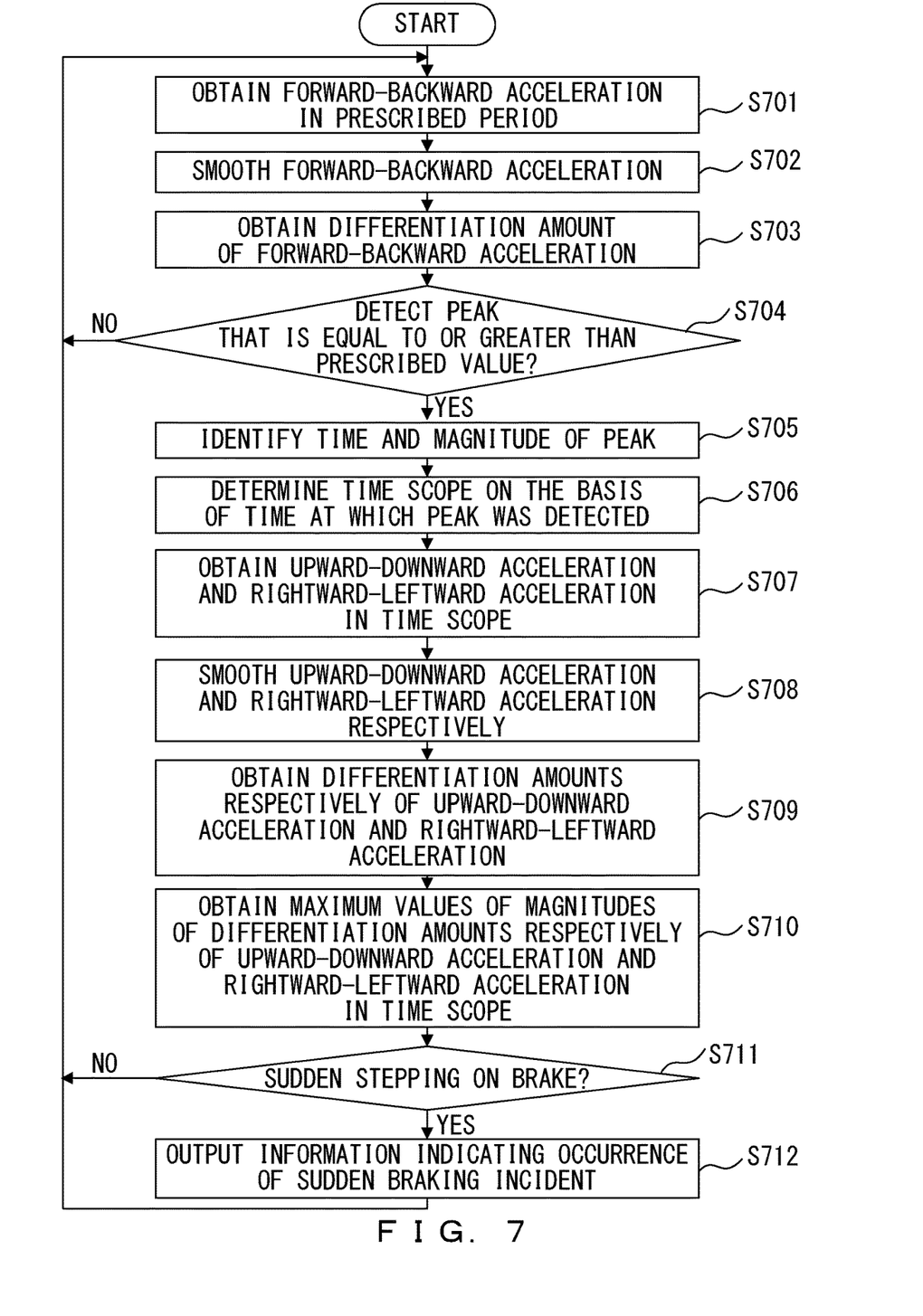
FIG. 7 exemplifies a determination process of a sudden braking incident according to the second embodiment.

FIG. 7 exemplifies a determination process of a sudden braking incident performed by the control unit 200 of the on-board device 2 according to the second embodiment. In one embodiment, the control unit 200 of the on-board device 2 may start the determination process of the sudden braking incident of FIG. 7 when for example the power of the on-board device 2 is supplied.

The processes in S701 through S706 that follow may correspond respectively to S401 through S406, which were described in FIG. 3, and in one embodiment, the control unit 200 may perform the processes described in S401 through S406, in the processes in S701 through S706.

In S707, the control unit 200 obtains the upward-downward acceleration and the rightward-leftward acceleration measured in the time scope determined in S706. In one embodiment, the control unit 200 may read the measurement information 601 having the time 602 in the time scope determined in S706 so as to obtain the information of the upward-downward acceleration 603 associated with the time 602 and the information of the rightward-leftward acceleration 605, respectively. In S708, the control unit 200 smoothes the obtained upward-downward acceleration 604 and the rightward-leftward acceleration 605, respectively. In one embodiment, smoothing may be performed by using for example a method of kernel smoothing as described in S402. For example, the control unit 200 may use, as an input value, a set of the obtained upward-downward acceleration 604 in time series instead of the forward-backward acceleration 303 used in S402 so as to obtain, in a weighted average calculation, the value of the smoothed upward-downward acceleration at time t by equation 3 above. Also, similarly for example, the control unit 200 may use, as an input value, a set of the obtained rightward-leftward acceleration 605 in time series instead of the forward-backward acceleration 303 used in S402 so as to obtain, in a weighted average calculation, the value of the smoothed rightward-leftward acceleration at time t by equation 3 above.

In S709, the control unit 200 performs temporal differentiation on the smoothed upward-downward acceleration and rightward-leftward acceleration respectively so as to calculate the differentiation amount of upward-downward acceleration and the differentiation amount of rightward-leftward acceleration. Note that a calculation of the differentiation amount of the smoothed upward-downward acceleration may be conducted by calculating equation 4 above by using for example smoothed upward-downward acceleration instead of the smoothed forward-backward acceleration used in S403 above. Also, similarly, a calculation of the differentiation amount of the smoothed rightward-leftward acceleration may be conducted by calculating equation 4 above by using for example smoothed rightward-leftward acceleration instead of the smoothed forward-backward acceleration used in S403 above. Also, in S709, the control unit 200 may use equation 4 to calculate the differentiation amount of a plurality of pieces of upward-downward acceleration and the differentiation amount of a plurality of pieces of rightward-leftward acceleration in the time scope determined in S706.

In S710, the control unit 200 obtains the maximum value of the magnitude in the time scope determined in S706, for each of the differentiation amount of the upward-downward acceleration and the differentiation amount of the rightward-leftward acceleration obtained in S709. In S711, the control unit 200 determines whether or not a peak is due to a sudden braking incident on the basis of the peak value of the magnitude of the differentiation amount of the forward-backward acceleration identified in S705, the maximum value of the magnitude of the differentiation amount of the upward-downward acceleration obtained in S710 and the maximum value of the magnitude of the differentiation amount of the rightward-leftward acceleration. In one embodiment, the control unit 200 may determine that a sudden braking incident occurred when for example the magnitude of the differentiation amount of forward-backward acceleration is greater than the magnitude of the differentiation amount of upward-downward acceleration and than the magnitude of the differentiation amount of rightward-leftward acceleration. When it is determined that a sudden braking incident did not occur in S711 (NO in S711), the flow returns to S701. When it is determined that a sudden braking incident occurred in S711 (YES in S711), the flow proceeds to S712. Note that in the process in S711, the control unit 200 may function as the determination unit 201.

In S712, the control unit 200 outputs information indicating that a sudden braking incident occurred, and the flow returns to S701. In one embodiment, the control unit 200 may output information that instructs an audio output device provided in the on-board device 2 to issue an alarming sound, as information indicating that a sudden braking incident occurred. Thereby, it is possible to warn for example a driver who suddenly stepped on a brake.

As described above, in the second embodiment, in determination of presence or absence of occurrence of a sudden braking incident, the magnitude of the differentiation amount of forward-backward acceleration is also compared with the magnitude of the differentiation amount of rightward-leftward acceleration in addition to the comparison with the magnitude of the differentiation amount of upward-downward acceleration. Accordingly, the second embodiment can further improve detection accuracy of occurrence of a sudden braking incident by using the differentiation amount of rightward-leftward acceleration, in addition to achieving the effects achieved by the first embodiment. For example, because the differentiation amount of rightward-leftward acceleration has high correlation with a situation with a vehicle tilting to the right or left such as one where the two wheels on one of the left and right side of the vehicle are running on something convex or concave, by using the differentiation amount of rightward-leftward acceleration, it is possible to suppress cases where a variation in the differentiation amount of forward-backward acceleration caused in this kind of situation is incorrectly determined to be a sudden stepping on a brake.

In the above, while some embodiments have been exemplified, the embodiments are not limited to the above embodiments. For example, in the second embodiment, a case is described where the magnitude of the differentiation amount of forward-backward acceleration is compared with both the magnitude of the differentiation amount of upward-downward acceleration and the magnitude of the differentiation amount of rightward-leftward acceleration. However, in another embodiment, the control unit 200 may determine the presence or absence of occurrence of a sudden braking incident by comparing the magnitude of the differentiation amount of forward-backward acceleration with the magnitude of the differentiation amount of rightward-leftward acceleration.

Also, in another embodiment, the magnitude of the differentiation amount of forward-backward acceleration may be compared with for example a function value generated from the maximum value of the magnitude of the differentiation amount of upward-downward acceleration, the maximum value of the magnitude of the differentiation amount of rightward-leftward acceleration and a prescribed value used in S404 and S704, etc. Also, when for example the magnitude of the temporal differentiation amount of forward-backward acceleration is greater than the function value, the control unit 200 may determine that a sudden braking incident occurred. Note that a function for performing determination as this can perform determination by using for example a method such as machine learning that reduces a great number of pieces of data to a determination function that is statistically appropriate. For example, as sample data for which a human has visually determined whether or not a brake was suddenly stepped on, 1000 pieces of data that were determined to be a sudden stepping on a brake and 1000 pieces of data that were determined to be not a sudden stepping on a brake are respectively prepared. Also, as variables, the maximum value of the magnitude of the differentiation amount of upward-downward acceleration, the maximum value of the magnitude of the differentiation amount of rightward-leftward acceleration and a prescribed value used in S404 and S704 are prepared. Then, by using these variables, a function for determining whether or not each piece of the data is a sudden stepping on a brake may be obtained by calculating a function by machine learning in such a manner that the 2000 pieces of sample data are correctly classified from comparison with the magnitude of the differentiation amount of upward-downward acceleration. Also, it is also possible to execute determination of whether or not a sudden braking incident occurred by calculating a function value by using a thus obtained function and comparing the function value with the magnitude of the differentiation amount of forward-backward acceleration.

Also, the above embodiments described an example in which the control unit 200 of the on-board device 2 detects presence or absence of occurrence of a sudden braking incident, whereas the embodiments are not limited to this. For example, a different information processing apparatus may perform a process of detecting presence or absence of occurrence of a sudden braking incident by using data of the acceleration measured by the measurement unit 220 of the on-board device 2.

Also, for example, the operation flows of FIG. 4 and FIG. 7 are examples and the embodiments are not limited to them. For example, when it is possible, the operation flows of FIG. 4 and FIG. 7 may have the process order changed, may further include an additional process or may have some of the processes omitted.

Figure 8:
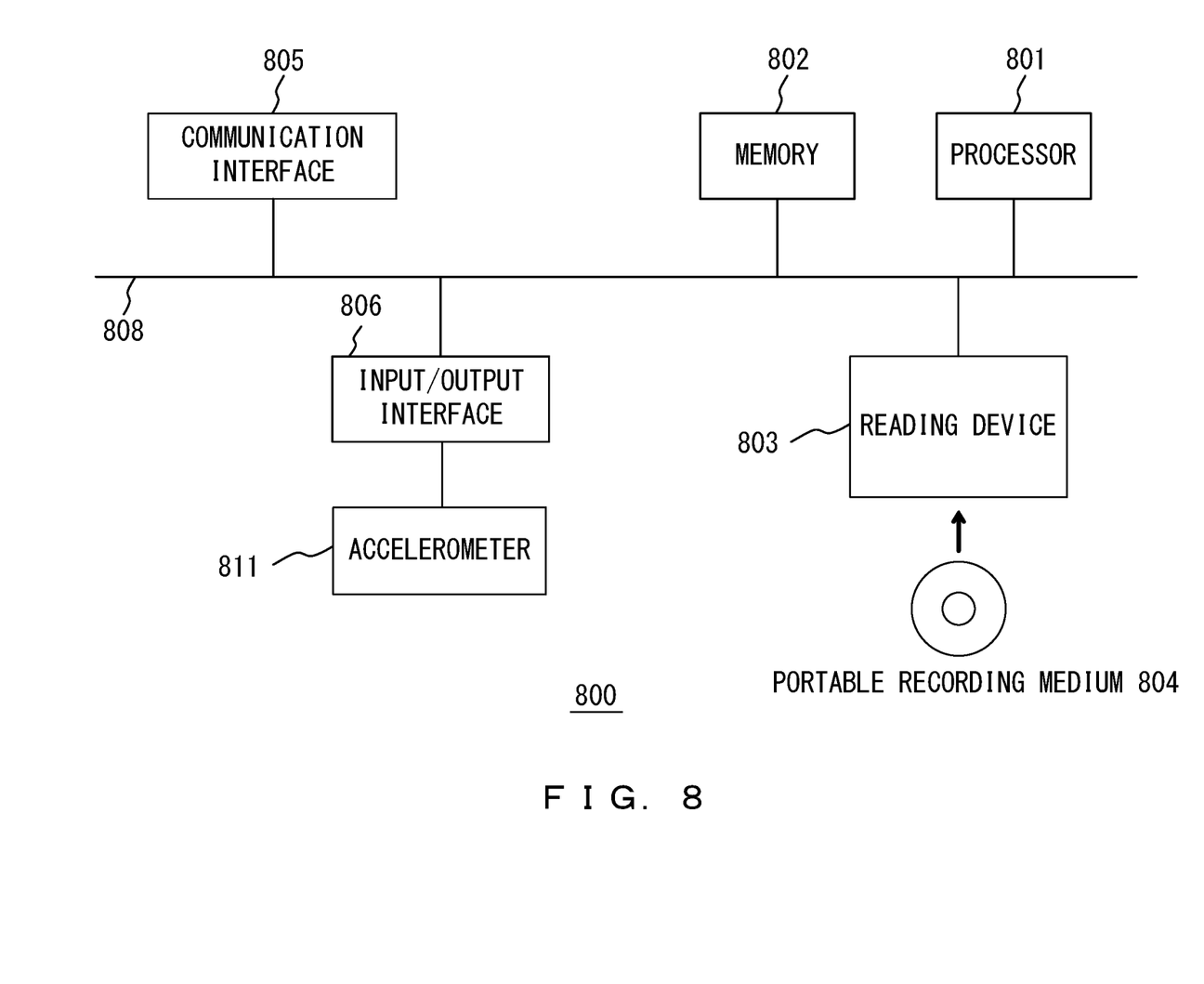
FIG. 8 exemplifies a hardware configuration of a computer for implementing the on-board device according to the embodiments.

FIG. 8 exemplifies a hardware configuration of a computer 800 (information processing apparatus) for implementing the on-board device 2 according to the embodiments. The hardware configuration of FIG. 8 for implementing the on-board device 2 includes for example a processor 801, a memory 802, a reading device 803, a communication interface 805 and an input/output interface 806. Note that the processor 801, the memory 802, the storage device 803, the reading device 803, the communication interface 805 and the input/output interface 806 may be connected to each other via for example a bus 808. Also, for example an accelerometer 811 may be connected to the input/output interface 806.

The processor 801 may use the memory 802 to execute a program describing for example procedures of the above operation flows in order to execute the processes in the above flows. For example, the control unit 200 of the on-board device 2 is the processor 801. The memory 802 is for example a semiconductor memory, and may include a RAM region and a ROM region. A ROM region may be for example a semiconductor memory such as a flash memory etc. The reading device 803 accesses a portable recording medium 804 in accordance with an instruction from the processor 801. The portable recording medium 804 may be for example a semiconductor memory such as a flash memory etc. including an SD memory card. The storage unit 210 may include for example the memory 802 and the portable recording medium 804. In the memory 802 of the on-board device 2, for example information such as the measurement record information 300, the measurement record information 600, etc. may be stored.

The communication interface 805 transmits and receives data via for example a network in accordance with an instruction from the processor 801. The input/output interface 806 may be for example an interface between an input device and an output device. For example the accelerometer 811 may be connected to the input/output interface 806. The accelerometer 811 may include for example a forward-backward accelerometer that measures forward-backward acceleration, an upward-downward accelerometer that measures upward-downward acceleration and a rightward-leftward accelerometer that measures rightward-leftward acceleration, the three pieces of acceleration being of a vehicle on which the accelerometer 811 is mounted. The accelerometer 811 may measure, in accordance with an instruction from the processor 801, forward-backward acceleration, upward-downward acceleration and rightward-leftward acceleration of a vehicle on which the accelerometer 811 is mounted so as to report the result to the processor 801. The above measurement unit 220 may be for example the accelerometer 811. Also, the input device may be for example an input key, a touch panel, etc. The output device may be for example an audio output device such as a speaker etc. that outputs for example audio and may be a display device such as a display, a touch panel, etc.

Also, the respective programs according to the embodiments may be provided to the on-board device 2 in a form for example in which (1) They are installed in the memory 802 in advance;
(2) They are provided through the portable recording medium 804; and
(3) They are provided from a program server through a network.

Note that the hardware configurations of the computers 800 described by referring to FIG. 8 is exemplary, and the embodiments are not limited to this. For example, some or all of the functions of the control unit 200 of the on-board device 2 described above may be implemented as hardware by using an FPGA, SoC, etc. in a different embodiment. Note that FPGA is an abbreviation for Field Programmable Gate Array. SoC is an abbreviation for System-on-a-chip.

According to the embodiments described above, it is possible to improve the detection accuracy of occurrence of a sudden braking incident.

Also, it is to be understood by those skilled in the art that some embodiments including the above embodiments include various types of variations and alternatives for the embodiments described above. For example, the various types of embodiments can be embodied by modifying constituents. Also, various embodiments may be implemented by appropriately combining a plurality of constituents described in the above embodiments. Further, various embodiments may be implemented by deleting or replacing some of all of the constituents described in the embodiments or by adding some constituents to constituents described in the embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method performed by a computer, comprising
determining, by a processor, whether a brake pedal was suddenly depressed, based on a comparison between a first magnitude of a forward-backward-acceleration differentiation amount obtained through temporal differentiation of acceleration in forward and backward directions of a vehicle measured by an accelerometer mounted on the vehicle and a second magnitude of an upward-downward-acceleration differentiation amount obtained through temporal differentiation of acceleration in upward and downward directions of the vehicle measured by the accelerometer in a prescribed temporal interval that temporally ranges before and after a timing at which the acceleration in the forward and backward directions was measured;

diagnosing, by the processor, whether the vehicle is being driven appropriately based on the comparison of the first magnitude of the forward-backward-acceleration differentiation amount and the second magnitude of upward-downward-acceleration differentiation amount; and outputting information indicating inappropriate driving when the determining determines that the brake pedal was suddenly depressed.

2. The determination method according to claim 1, wherein the determining is conducted on the forward-backward-acceleration differentiation amount having the first magnitude that is equal to or greater than a prescribed value.

3. The determination method according to claim 1, wherein the determining determines that the at least one brake was suddenly activated, when the first magnitude of the forward-backward-acceleration differentiation amount is greater than the second magnitude of the upward-downward-acceleration differentiation amount.

4. The determination method according to claim 1, wherein the determining determines whether the at least one brake was suddenly activated also based on the comparison between the first magnitude of the forward-backward-acceleration differentiation amount and a third magnitude of a rightward-leftward-acceleration differentiation amount obtained through temporal differentiation of acceleration in left and right directions of the vehicle measured by the accelerometer in the prescribed temporal interval that temporally ranges before and after the timing at which the acceleration in the forward and backward directions was measured.

5. The determination method according to claim 1, wherein the forward-backward-acceleration differentiation amount is obtained by smoothing acceleration in forward and backward directions measured in a prescribed period including a timing at which the acceleration in the forward and backward directions was measured and performing temporal differentiation on a value obtained by the smoothing.

6. A non-transitory computer-readable recording medium having stored therein a program for causing a computer to execute a process, the process comprising determining, by an accelerometer mounted on a vehicle, acceleration in forward and backward directions and acceleration in upward and downward directions of the vehicle;

determining whether at least one brake was suddenly activated, based on a comparison between a first magnitude of a forward-backward-acceleration differentiation amount obtained through temporal differentiation of the acceleration in forward and backward directions of the vehicle measured by the accelerometer mounted on the vehicle and a second magnitude of an upward-downward-acceleration differentiation amount obtained through temporal differentiation of the acceleration in upward and downward directions of the vehicle measured by the accelerometer in a prescribed temporal interval that temporally ranges before and after a timing at which the acceleration in the forward and backward directions was measured;

diagnosing, by the computer, whether the vehicle is being driven appropriately based on the comparison of the first magnitude of the forward-backward-acceleration differentiation amount and the second magnitude of upward-downward-acceleration differentiation amount; and output information to correct inappropriate driving when the determining determines that the brake pedal was suddenly depressed.

7. An information processing apparatus in a vehicle having a brake pedal and an accelerometer mounted therein, comprising a memory, and a processor, connected to the memory and the accelerometer, configured to determine whether the brake pedal was suddenly depressed, based on a comparison between a first magnitude of a forward-backward-acceleration differentiation amount obtained through temporal differentiation of acceleration in forward and backward directions of the vehicle measured by the accelerometer and a second magnitude of an upward-downward-acceleration differentiation amount obtained through temporal differentiation of acceleration in upward and downward directions of the vehicle measured by the accelerometer in a prescribed temporal interval that temporally ranges before and after a timing at which the acceleration in the forward and backward directions was measured, diagnose whether the vehicle is being driven appropriately based on the comparison of the first magnitude of the forward-backward-acceleration differentiation amount and the second magnitude of upward-downward-acceleration differentiation amount, and indicate correction of inappropriate driving upon determining that the brake pedal was suddenly depressed.

* * * * *